(12) United States Patent
Krueger

(10) Patent No.: US 7,586,205 B2
(45) Date of Patent: Sep. 8, 2009

(54) METHOD AND SYSTEM FOR REGULATION OF THE ROTATIONAL SPEED OF A ROTOR ON A WIND TURBINE

(75) Inventor: Thomas Krueger, Westerroenfeld (DE)

(73) Assignee: Repower Systems AG, Hamburg (DE)

( * ) Notice: Subject to any disclaimer, the term of this patent is extended or adjusted under 35 U.S.C. 154(b) by 0 days.

(21) Appl. No.: 11/960,150

(22) Filed: Dec. 19, 2007

(65) Prior Publication Data
US 2008/0136188 A1 Jun. 12, 2008

Related U.S. Application Data

(63) Continuation of application No. PCT/EP2006/005794, filed on Jun. 16, 2006.

(30) Foreign Application Priority Data
Jun. 21, 2005 (DE) .................. 10 2005 029 000

(51) Int. Cl.
*F03D 9/00* (2006.01)
*H02P 9/04* (2006.01)

(52) U.S. Cl. .................. 290/44; 290/55
(58) Field of Classification Search .......... 290/44, 290/55; 416/7, 132 B; 60/398; 415/4.2, 415/4.5, 2.1
See application file for complete search history.

(56) References Cited

U.S. PATENT DOCUMENTS 4,189,648 A * 2/1980 Harner .................. 290/44
4,193,005 A   3/1980 Kos et al.
4,205,235 A * 5/1980 Pal et al. ................. 290/44
4,584,486 A * 4/1986 Quynn .................... 290/44
4,695,736 A * 9/1987 Doman et al. ............. 290/44

(Continued)

FOREIGN PATENT DOCUMENTS

DE          29 22 972 C2      1/1980

(Continued)

OTHER PUBLICATIONS

Hau, E.; "Windkraftanlagen"; Springer Verlag; Berlin, Germany; 1995, XP002398040; pp. 318-333.

*Primary Examiner*—Julio Gonzalez Ramirez
(74) *Attorney, Agent, or Firm*—Rankin, Hill & Clark LLP

(57) ABSTRACT

The invention relates to a method and a system for regulation of the rotational speed (52) of a rotor on a wind energy unit with a generator and a rotor blade. The first set parameter is a pitch angle (Pitch) of the rotor blade and the second set parameter is the torque of the generator. The system comprises a pitch angle control or regulation device (32), a torque control or regulation device (33), a first device for determination of a first rotational speed set value (28) (first rotational speed set value determination device (29)) and a second device (26) for determination of a second rotational speed set value (29) (second rotational speed set value determination device (26)). The first rotational speed set value (28) may be supplied to the pitch angle control or regulation device (32) and the second rotational speed set value (29) may be supplied to the torque control or regulation device (33), wherein the first and second rotational speed set value (28, 2)) may be different from each other.

12 Claims, 5 Drawing Sheets

U.S. PATENT DOCUMENTS

| | | | |
|---|---|---|---|
| 4,700,081 A * | 10/1987 | Kos et al. | 290/44 |
| 5,155,375 A | 10/1992 | Holley | |
| 5,289,041 A * | 2/1994 | Holley | 290/44 |
| 6,137,187 A | 10/2000 | Mikhail et al. | |
| 7,095,131 B2 * | 8/2006 | Mikhail et al. | 290/44 |
| 2002/0105189 A1 * | 8/2002 | Mikhail et al. | 290/44 |
| 2003/0057703 A1 * | 3/2003 | Howes et al. | 290/1 R |
| 2004/0094964 A1 * | 5/2004 | Mikhail et al. | 290/44 |
| 2006/0002791 A1 * | 1/2006 | Moroz | 416/1 |
| 2006/0033338 A1 * | 2/2006 | Wilson | 290/44 |
| 2008/0140263 A1 * | 6/2008 | Wang et al. | 700/291 |

FOREIGN PATENT DOCUMENTS

| | | |
|---|---|---|
| DE | 195 32 409 A1 | 3/1997 |
| EP | 1 007 844 B1 | 7/2004 |
| WO | 99/07996 | 2/1999 |
| WO | 2006/032451 A1 | 3/2006 |

* cited by examiner

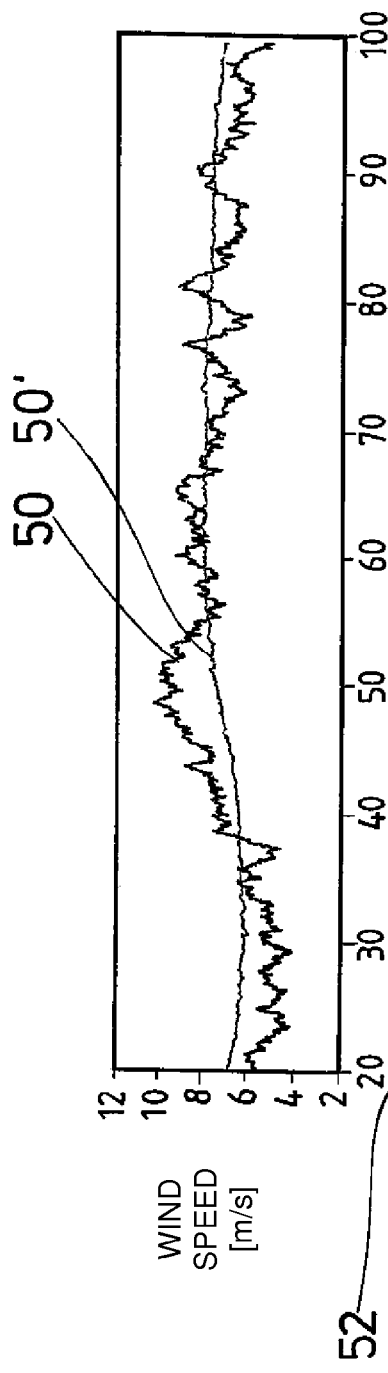
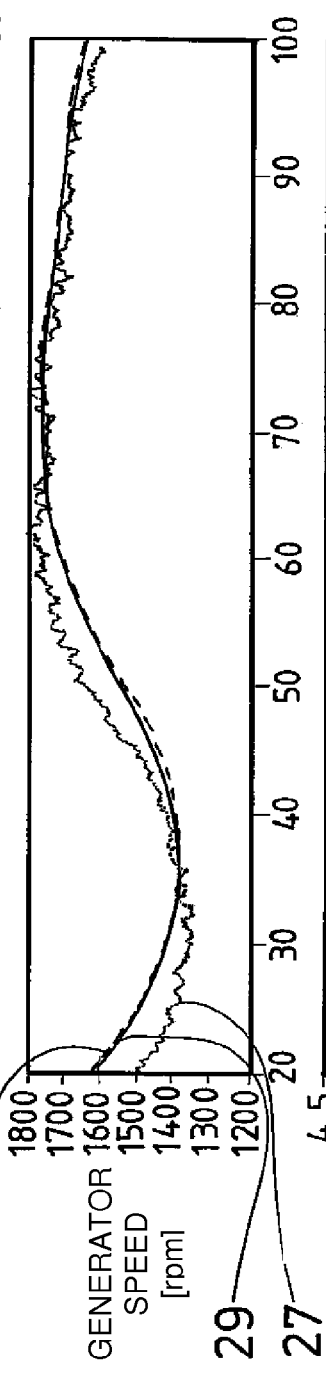
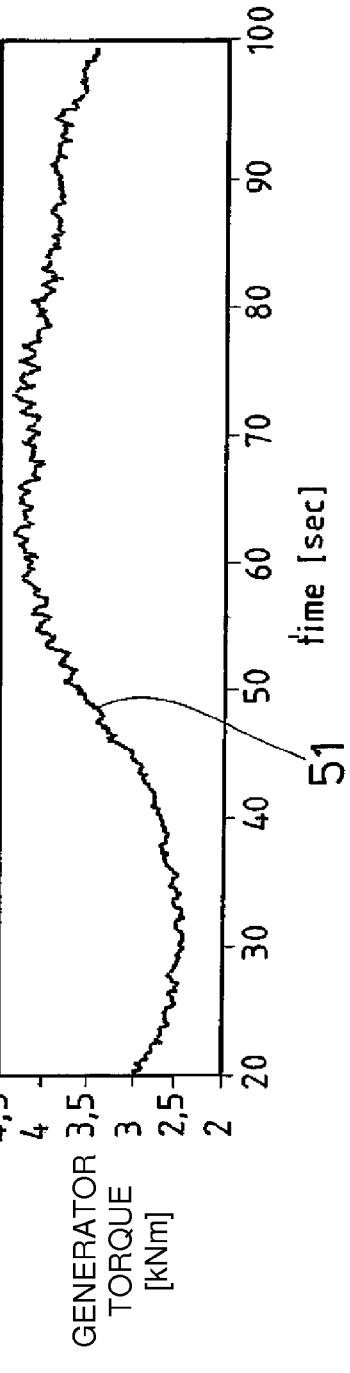
Fig. 4a
Fig. 4b
Fig. 4c

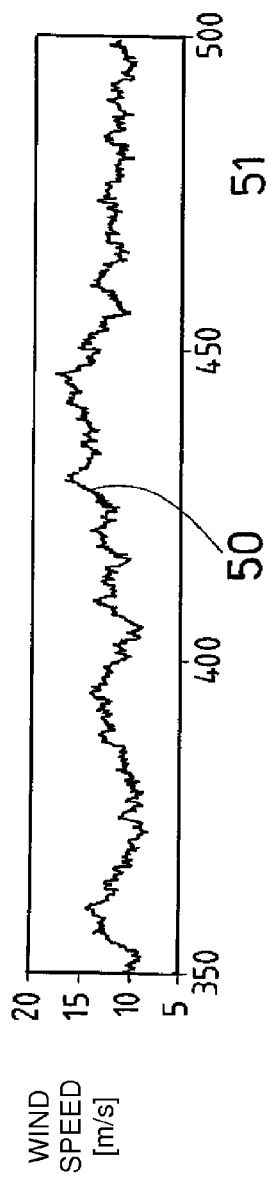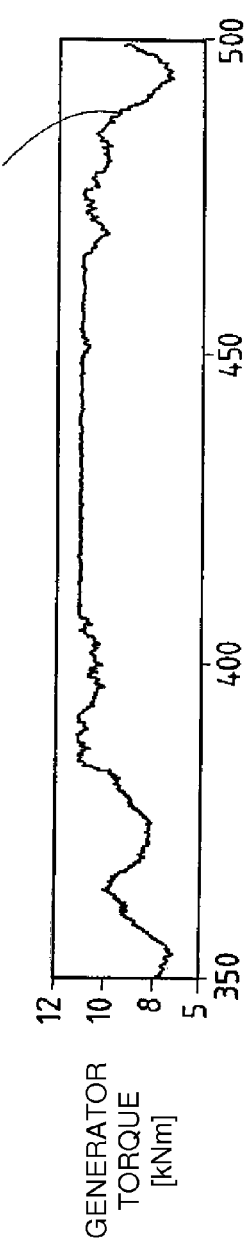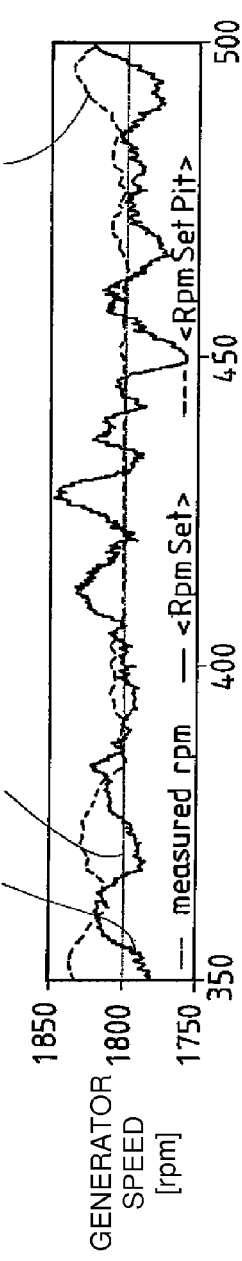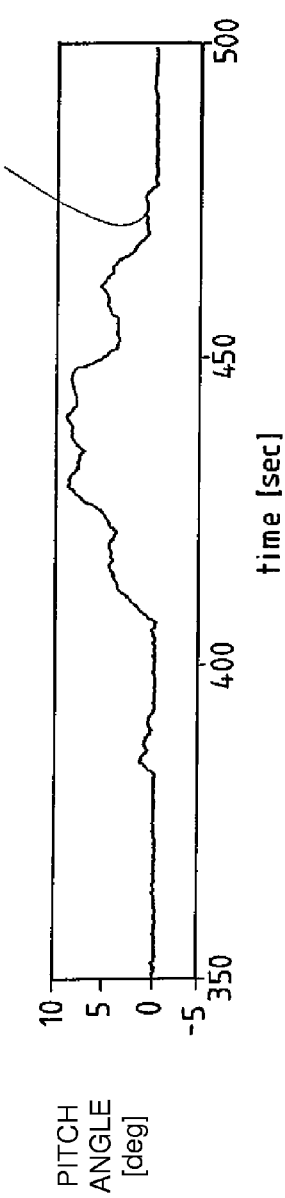

METHOD AND SYSTEM FOR REGULATION
OF THE ROTATIONAL SPEED OF A ROTOR
ON A WIND TURBINE

This application is a continuation of currently pending PCT application PCT/EP2006/005794, filed on Jun. 16, 2006, the entire disclosure of which is incorporated by reference herein.

BACKGROUND OF THE INVENTION

The invention relates to a method and a system for the regulation of the rotational speed of a rotor of a wind turbine (wind energy plant), wherein the wind turbine comprises a generator and a rotor blade.

A wind energy plant or wind turbine converts wind energy into electrical energy and feeds it mostly into a public power supply system. This occurs when the kinetic energy of the wind displaces the rotor into a rotational movement, which is forwarded to a generator and is converted into an electrical current.

Different approaches are selected for the regulation of the rotational speed of a rotor of a speed-variable wind turbine. Two operating states are normally differentiated, namely the speed regulation in partial load mode and in full load mode, wherein a so-called "torque regulation" normally takes place in partial load mode and a so-called "pitch regulation" in full load mode. Torque regulation is understood as a rotational speed regulation, in which the rotational speed of the plant in partial load mode is set to the optimum ratio between the circumferential speed of the rotor and the wind speed in order to achieve a high power output of the wind turbine. The power output can be described using the term power coefficient cp, which is a quotient of the power intake of the system and the power contained in the air movement. The ratio of the circumferential to the undisturbed wind speed is called tip speed ratio. The rotor blades are thereby set to the blade angle, which creates the highest drive torque on the rotor shaft. The rotational speed is affected by the counter torque on the generator. This means that the set value for the rotational speed regulation via the so-called torque regulation is the torque and in particular the torque on the generator, which is higher, the more power the generator takes from the system or wind turbine and feeds to a network.

The rotational speed regulation, called pitch regulation, which intervenes in full load mode, functions via the adjustment of the blade angle of the rotor blade. If the nominal torque on the generator (nominal power) is reached in the case of the nominal wind speed, the rotational speed can no longer be held at the operating point through a further increase of the generator torque. Thus, the degree of aerodynamic efficiency of the blades worsens in that they are driven out of their optimal adjustment angle. This process is called "pitching," from the English term "to pitch." The rotational speed is thus affected as of the reaching of the nominal generator torque via the adjustment angle of the blades. Gusts are better controlled through a short-term increase in the rotor speed and the adjustment of the angle of attack than in the case of other systems that do not have that type of so-called pitch regulation. The power intake of the rotor is thus influenced via the set value of the blade angle of the rotor blade, whereby the rotational speed of the rotor can be controlled.

There are a number of patents and technical articles for the regulation of rotational speed-variable wind turbines through blade adjustment (pitch regulation) and manipulation of the generator torque (torque or power regulation). The rotational speed of the wind turbine is ultimately regulated in the case of all known methods. In the partial load mode, one tries to track the speed of the wind in order to, thus, hold the rotor at a constant blade angle at the energetically optimal operating point. In full load mode, one tries to hold the rotational speed and torque constant. The rotational speed is, thus, regulated through variation of the blade angle.

The regulation of a rotational speed-variable wind energy unit is known from U.S. Pat. No. 4,695,736 A. This document discloses that a rotational speed target value is determined from the measured power via a characteristic line, which is retraced in the partial load area through variation of the generator torque. When the nominal torque is reached, the pitch regulator is activated, which then tries to regulate the rotational speed at a fixed value.

A wind estimator is known from U.S. Pat. No. 5,155,375 A, which determines the actual wind speed from the target torque value, the blade angle measurement value as well as the rotor speed measurement value. In addition to the target value for the rotational speed, it is used to determine precontrol values for the blade angle and the generator torque. The rotational speed is then retraced along a target value.

In U.S. Pat. No. 6,137,187 A, the torque of the generator is set via a fixed power/rotational speed characteristic line designed as a lookup table. A pitch regulator and a torque regulator work independently of each other and regulate at a fixed nominal rotational speed.

The method and regulation systems described in the state of the art already partially optimize the energy output at low wind speeds. The transition between partial and full load mode is not handled or is only insufficiently handled. In particular when the transition is designed between partial and full load mode, an even higher energy output can, thus, be achieved and the operating load can be decreased.

In the case of the system for variable rotational speed operation according to U.S. Pat. No. 6,137,187 A, which corresponds with EP 1 007 844 B1, which discloses an asynchronous generator for the creation of power, a torque control unit for the control of the generator torque when using a field-oriented regulation and an adjustment angle control unit for angle of attack regulation, which is based on the rotor speed of the generator and operated independently of the torque control unit, the speed/power characteristic lines must be designed such that the rotational speed in partial load mode is always lower than the nominal rotational speed, in order to prevent the pitch regulator from engaging prematurely and regulating the system from the breakaway speed. This partially results in considerable profit cuts.

BRIEF SUMMARY OF THE INVENTION

The object of the invention is to further develop a method and a system for the regulation of the rotational speed of a rotor of a wind turbine with a generator and a rotor blade such that a higher energy output is possible.

This object is solved through a method for the regulation of the rotational speed of the rotor of a wind turbine with a generator and at least one rotor blade, wherein a blade angle (pitch) of the rotor blade is provided as a first set value and a torque of the generator as a second set value, with the following method steps:

Provision of a first rotational speed target value as the input value for a blade angle control or regulation device and Provision of a second rotational speed target value as the input value for a torque control or regulation device, wherein the first and the second rotational speed target value can be different from each other.

Preferably, the first and/or the second rotational speed target values are changeable or variable rotational speed target values. Preferably, the first and the second rotational speed target value are changed based on the current operating conditions. Through the regulation method according to the invention, the power output of the wind turbine can be increased through the regulation method according to the invention, since in particular, in the transition area from partial load to full load, two differing rotational speed target values as the input value for a torque control or regulation device and a blade angle control or regulation device enable an independence of the control or regulation of the blade angle and the torque. It can, for example, be realized hereby that the pitch regulator (blade angle control or regulation device) can be used in a transition area from partial load to full load, so that it already begins to regulate at a positive gust (rapid increase in wind speed) before full load is reached or control or regulate the blade angle accordingly. Accordingly, the torque regulator or the torque control or regulator device in the transition area from partial load to full load or full load to partial load can also become operational in advance when the rotational speed target value of the torque control or regulation device tracks an optimal rotational speed target value.

The first and the second rotational speed target values are preferably different from each other in a transition area from full load and partial load. The transition area can for example begin at 80% full load or nominal load and end at 110% of the wind speed, in which full load mode or nominal load mode of the wind turbine is given.

A third rotational speed target value is preferably provided wherein the first and the second rotational speed target value are determined from the third rotational speed target value. Within the framework of the invention, the term "to determine" is also understood as "to calculate" and "to derive." The rotational speed is preferably that in the generator. The third rotational speed target value is preferably the optimal rotational speed, i.e. the rotational speed at which an optimum power output can be achieved. The third rotational speed target value can also preferably be changed or is a variable rotational speed target value.

The first rotational speed target value is preferably determined from a difference of a torque target value and a torque actual value (torque difference). Within the framework of the invention, terms in parentheses are mean descriptions of a definition that was provided previously. The torque difference, which can be a torque regulation difference, is thus the difference between a torque target value and a torque actual value. The torque actual value is, for example, measured in the generator or can also be measured at another location, e.g. via a measurement of the electronic or electrical variable in the converter. A particularly simple regulation is then given when the torque difference contributes to the determination of the first rotational speed value as a linear term.

The second rotational speed target value is preferably determined from the blade angle target value and/or from a difference between a blade angle target value and a blade angle actual value (blade angle difference). The blade angle actual value is either saved in a computer or memory according to the adjustment of the blade angle or is or can be measured accordingly. The so-called "fine pitch," namely the lower limit for the blade angle target value, can also be derived from the blade angle difference. This value (fine pitch) is dependent on the wind turbine and is preferably also dependent on the wind speed. It is especially preferred if this value is dependent on the tip speed ratio of the rotor. A particularly simple regulation method is then possible when the blade angle difference contributes to the determination of the second rational speed target value as a linear term.

The characteristic that the first and the second rotational speed target value can be different from each other is understood within the framework of the invention, in particular, to mean that they can, for example, deviate from each other. The deviation preferably occurs in an area of the transition from partial load to full load or vice versa. The area is preferably defined by a blade angle difference and/or a torque difference, which is greater than zero.

The third rotational speed target value is preferably an optimal rotational speed target value, thus corresponding with a rotational speed, which is dependent on the wind speed, at which an optimal power output of the wind turbine is given.

The third rotational speed target value is preferably determined from a torque actual value. The regulation method is particularly efficient when the third rotational speed target value, in particular with, in particular a specifiable, time delay, tracks the torque actual value. A particularly efficient gust identification is thereby possible and an efficient utilization or even a readjustment of the wind turbine at gusts to the optimum operating point is possible, whereby high power efficiency is given.

The regulation method is particularly efficient when the determination of the first rotational speed target value comprises an addition of the third rotational speed target value and the function $k_1 \times \text{torque difference} \times \theta(\text{torque difference})$. In the case of function $\theta$, which in this case depends on the torque difference, it is the Heaviside function. This is 0 for a torque difference or the variable, on which the Heaviside function depends, provided that the value is $\leq 0$ and 1, provided that the torque difference is $>0$. The determination of the second rotational speed target value preferably comprises a subtraction of the function $k_2 \times \text{blade angle difference} \times \theta$ (blade angle difference) from the third rotational speed target value.

It is particularly preferred if in the case of the exceeding of an, in particular specifiable, difference of a rotational speed actual value from the first, second and/or third rotational speed target value and/or in the case of the exceeding of an, in particular specifiable, value of the torque difference, the wind turbine is braked or the speed of the rotor is quickly reduced. In the case of the exceeding of the regulation deviation of the torque or the rotor speed from a deviation limit value, the system then detects an error. For example, the torque falls to 0 when the generator fails. In this case, the torque regulation deviation increases very strongly. The regulator then changes its regulation algorithm since the system then brakes or must be stopped. In this case, the blade angle target value is, for example, intensified or maximized namely in the direction of a lower rate of revolution. An important advantage of this regulation method is that the method or the regulator itself detects an error and can react quicker.

Furthermore, it is preferred when a superordinate regulation method is provided for the regulation method according to the invention. This regulation method or this regulator is called the power regulation method or power regulator and always intervenes when a constant electric power output is required or is necessary. The regulation method or the regulator then intervenes in the torque regulation of the generator, in which a maximum torque is given, which is lower than the nominal torque. Thus, the blade angle regulator or the pitch regulator then also intervenes faster.

The object is also solved through a system for the regulation of the rotational speed of the rotor of a wind turbine with a generator and a rotor blade comprising a blade angle control or regulation device and a torque control or regulation device, wherein a first device for the determination of a first rotational speed target value (first rotational speed target value determination device) and a second device for the determination of a second rotational speed target value (second rotational speed target value determination device) are provided, wherein the first rotational speed target value can be supplied to the blade angle control or regulation device and the second rotational speed target value can be supplied to the torque control or regulation device, wherein the first and the second rotational speed target values can be different from each other. Within the framework of the invention, the system according to the invention can also be a device according to the invention.

The first and/or the second rotational speed target value are preferably changeable or variable rotational speed target values. The first rotational speed target value determination device and the second rotational speed target value determination device are preferably one single device. In this case, the device can have several outputs. If a third device is provided for the determination of a third rotational speed target value (third rotational speed target value determination device), wherein one output of the third rotational speed target value determination device is connected with one input of the first and/or second rotational speed target value determination device, the efficiency of the wind turbine, in particular in the case of gusts, can be increased very well. Within the framework of the invention, connected is understood as an, in particular indirect, connection for example via a cable or a data bus. A wireless data connection or another type of connection can also be provided. All rotational speed target value determination devices are preferably provided in one single device and/or in one common housing. Advantageously, the first, second and/or third device is at least a data processing device or at least a computer or comprises at least one computer.

A device for the determination of the difference between a torque target value and a torque actual value (torque difference determination device) is preferably provided, wherein the output of the torque difference determination device is at least indirectly connected with an input of the first rotational speed target value determination device. A device for the determination of the difference between a blade angle target value and a blade angle actual value (blade angle difference determination device) is also preferably provided, wherein the output of the blade angle determination device is at least indirectly connected with an input of the second rotational speed target value determination device, the output of which is at least indirectly connected with the third rotational speed target value determination device.

A wind turbine according to the invention with a system for the regulation of the speed of a rotor according to the invention, which was described above, is also provided.

The invention is described below, without restricting the general intent of the invention, based on exemplary embodiments in reference to the drawings. We expressly refer to the drawings with regard to the disclosure of all details according to the invention that are not explained in greater detail in the text.

BRIEF DESCRIPTION OF THE DRAWINGS

FIG. 4 4a shows a diagram of the wind speed over time, 4b shows a diagram of the generator rotational speed over time and 4c shows a diagram of the generator torque over time.

FIG. 5 5a shows a diagram of a measured wind speed over time, 5b shows a diagram of a measured generator torque over time, 5c shows a diagram of the generator rotational speed or the rotational speed with different curves over time, 5d shows a diagram of a blade angle over time.

DETAILED DESCRIPTION OF THE INVENTION

Figure 1:
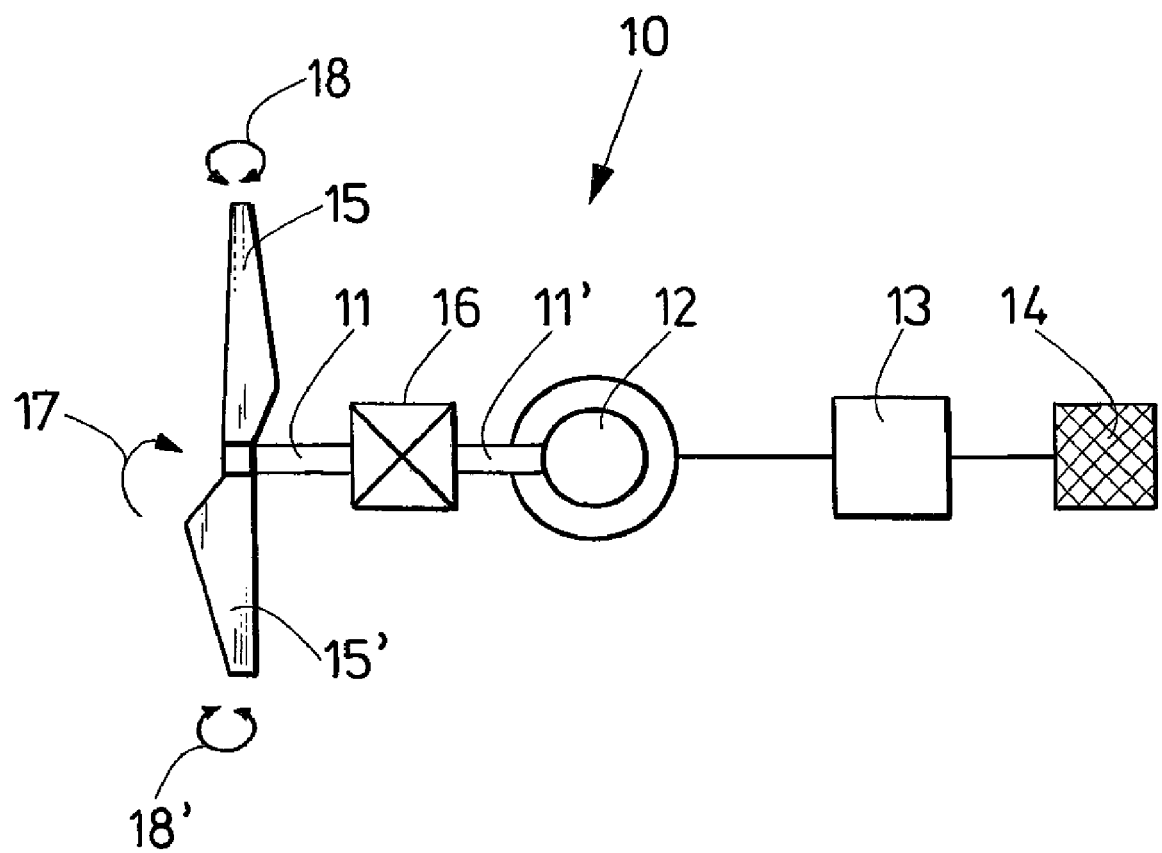
FIG. 1 shows a schematic representation of the important components of a wind turbine.

FIG. 1 shows in a very schematic manner a wind turbine 10, comprising a rotor 11, on which rotor blades 15 and 15' are arranged. The rotor 11 is connected with a drive 16. The drive 16 is connected with a generator 12 via a shaft 11'. The rotor 11 is rotatable, namely according to an indicated rotational direction 17. Through corresponding rotation of the rotor 11 and via the drive 16 also of the shaft 11', a conventional generator 12, for example, an asynchronous generator, can create electrical power, which can be made available to a network or grid 14, to which the consumers are for example connected, via a converter 13. Accordingly, convention regulations of rotational speed-variably operated systems are described for example in the book by Siegfried Heier, "Windkraftanlagen, Systemauslegung, Netzintegration und Regelung," (Wind Turbines, System Design, Network Integration and Regulation) Verlag Teubner, 2005, pages 320 through 328. FIG. 1 also indicates the change in the blade angle of the rotor blade 15, 15' and namely via a blade angle adjustment movement 18 or 18'. Through the adjustment of the blade angle (pitch) of the rotor blades 15 and 15', the power output of the rotor 11 or of the connected drive train(s) as well as of the rotor blades 15 and 15' belonging to the rotor is affected.

Figure 2:
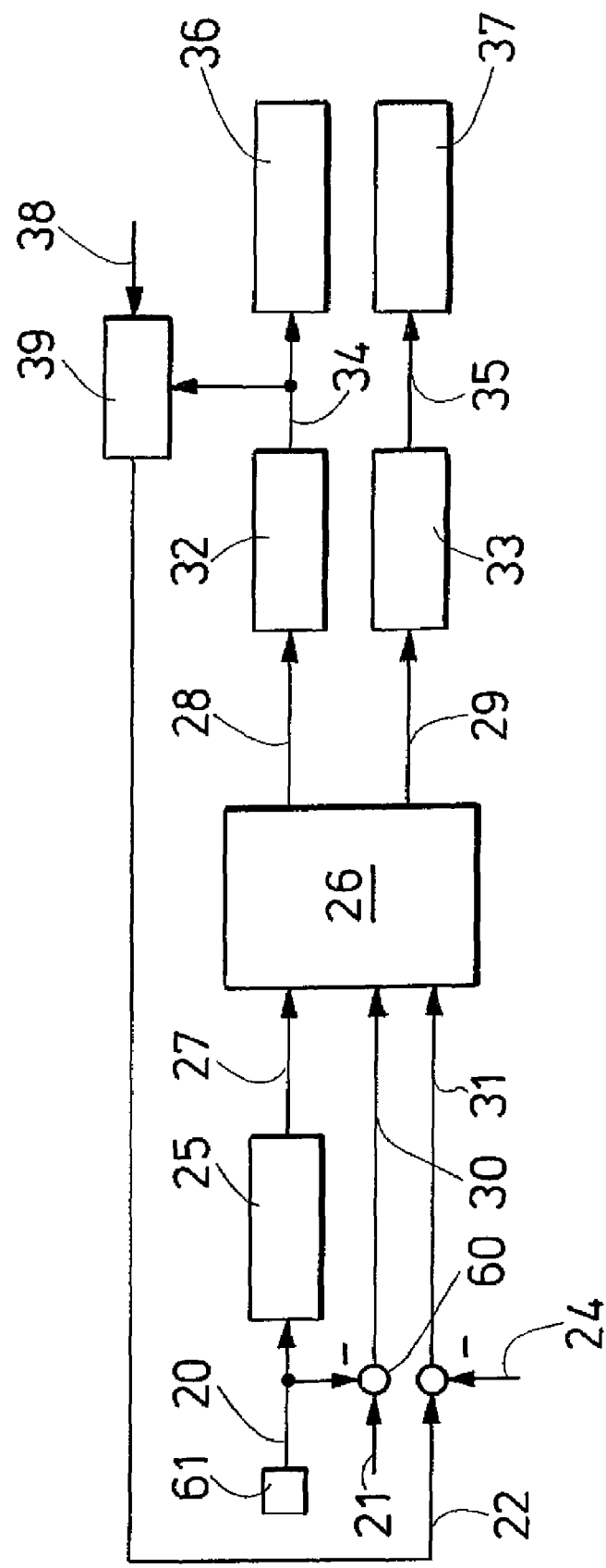
FIG. 2 shows a schematically simplified regulation diagram according to the invention.

In accordance with the invention, a regulation diagram is now used, as is shown schematically in FIG. 2. By means of a torque determination device 61 or a torque sensor 61, a torque, for example the torque taken from the system by the generator 12 or the torque used to brake the rotor 11, is measured and supplied to an RPM tracker 25 as a measured torque. The RPM tracker 25 (rotational speed tracker) determines or calculates a rotational speed target value from the measured torque. The rotational speed target value is hereby preferably the rotational speed, at which the rotor is operated at the best degree of efficiency. This target value, which is described as the first speed target value 27 within the framework of this invention, now serves to calculate or determine in a calculation unit 26, which can also be called the determination unit or RPM shifter, two different rotational speed target values for the blade angle regulator 32 and the torque regulator 33. This is a first rotational speed target value 28, which is supplied to the blade angle regulator 32, and a second rotational speed target value 29, which is supplied to the torque regulator 33.

The first torque target value 28 and the second torque target value 29 can now still depend on the values of a torque regulation difference 30 and a blade angle difference 31 lying against the input of the calculation unit 26. The torque regulation difference 30 is a difference value of a torque target value or nominal torque 21 and that of the measured torque 20. The corresponding difference is formed in the torque difference determination device 60. Instead of a blade angle difference 31, the blade angle target value 34 can lie directly against the input of the calculation unit 26.

The blade angle difference 31 results from a blade angle regulation deviation 22, from which a minimum blade angle 24 is subtracted. The minimum blade angle 24 is device-specific and can depend on the rotational speed. The minimum blade angle 24 can also depend on the wind speed and/or the tip speed ratio. The blade angle regulation deviation 22 results from a difference of the blade angle target value 34 and the blade angle actual value 38 formed in the difference device 39. The calculation unit 26 can be a computer.

The blade angle regulator 32, into which the first rotational speed target value 28 was imported, outputs a corresponding blade angle target value 34 to a blade angle adjustment device 36, for example, a hydraulic or electric adjustment system such as a motor. The torque regulator 33 outputs a torque set value 35 to a torque setting device 37. The torque setting device is usually a power electronics system, which is arranged in the converter 13. The torque regulator 33 can also regulate or control the slip of the generator 12, provided that a corresponding slip setting is possible. The wind turbine, according to the invention, can be provided with a drive or gear, as shown in FIG. 1, but can also be drive-less or gear-less. Other generators can also be used instead of an asynchronous generator.

The activity of the blade angle regulator 32 is controlled through targeted detuning of the rotational speed target values 28 and 29. For this, the rotational speed target value of the blade angle regulator 32 is set somewhat higher than the optimal rotational speed target value, for example, in the partial load area. This causes only the torque regulator 33 to normally be active, while the blade angle regulator 32 only intervenes in the case of strong gusts. In the full load area, the rotational speed target value 29 of the torque regulator 33 is set below the optimal rotational speed. This causes the blade angle regulator 32 to work mainly in the full load area, while the torque regulator 33 is only activated in the case of stronger negative gusts.

The RPM tracker 25 determines an optimal target rotational speed from the measured torque 20. This is machine-specific and depends on the wind speed. The blade angle regulator 32 compares the first rotational speed target value with a rotational speed actual value and outputs the blade angle target value as a set value. Accordingly, the torque regulator 22 compares the second rotational speed target value 29 with the rotational speed actual value and outputs the torque target value as a set value. Alternatively to the embodiment, in accordance with FIG. 2, the blade angle deviation 22 can be formed independently of the blade angle actual value 38. In this case, the difference device 39 is left out in FIG. 2 and the blade angle target value 34 is directly connected with the blade angle deviation 22 or matches it.

Figure 3:
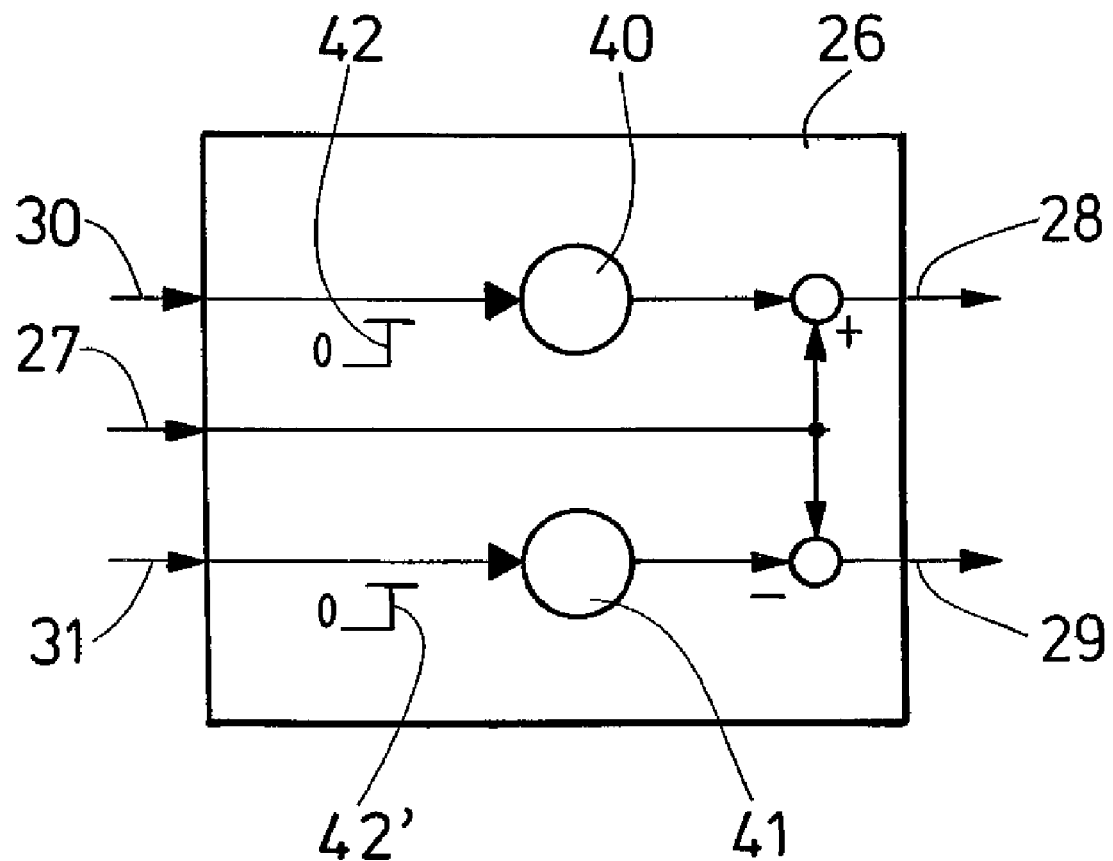
FIG. 3 shows a schematic section of the regulation diagram from FIG. 2.

FIG. 3 shows a section from FIG. 2, namely the calculation unit 26 in schematic form. The torque difference 30, the third rotational speed target value 37 and the blade angle difference 31 inputs are represented again. The torque regulation difference 30 is multiplied with k1 40 and the blade angle difference 31 with k2 41. k1 and k2 can be constants. However, they can also change depending on the input variable(s), for example torque difference, blade angle difference, third rotational speed target value, wind speed and/or tip speed ratio.

In the upper member, the result of the calculation is added to the third rotational speed target value 27 for the determination of the first rotational speed target value 28. In the bottom member, the result of the third rotational speed target value is subtracted for the determination of the second rotational speed target value 29. A case differentiation also still takes place, in which the third rotational speed target value 27 is looped in without changes to the first rotational speed target value 28 or to the second rotational speed target value 29. This occurs when the torque difference is $\leq 0$ and also when the blade angle difference is $\leq 0$. The resulting formulas are as follows:

$1^{st}$ rotational speed target value={$3^{rd}$ rotational speed target value+$k_1 \times$torque difference, if torque difference>0} OR[$3^{rd}$ rotational speed target value, if torque difference$\leq 0$}

$2^{nd}$ rotational speed target value={$3^{rd}$ rotational speed target value–$k_2 \times$blade angle difference, if blade difference>0} OR{$3^{rd}$ rotational speed target value, if blade difference$\leq 0$}

Thus, the detuning of the rotational speed target values 28 and 29 takes place through addition or subtraction of the difference signals of the torque and the blade angle. For the case when the torque regulation difference is >0, the partial load area is present and for the case that the torque difference is $\leq 0$, the full load area is present. Accordingly, a full load area is present when the blade angle difference is >0 and a partial load area when the blade angle difference is $\leq 0$.

Polynomials of the blade angle difference or the torque difference, for example quadratic terms, can also be used as further terms in the specified formulas for the first and the second rotational speed target value. The Heaviside function can also be shifted such that the selection criterion greater or less than/equal to zero is shifted to greater or less than/equal to a constant k3.

Through the invention, significant surpluses up to an annual mean of several percent are to be expected. A smooth, low-load transition between torque and blade angle regulation is achieved through the described tracing of the target values. Lower operating loads are to be achieved despite clearly higher output than with the regulation concepts according to the state of the art. Since the 1st rotational speed target value 28 of the blade angle regulator 32 also tracks the optimal rotational speed, it is achieved that the blade angle 32 also quickly intervenes in the partial load area in the case of strong wind. Compared to the state of the art, a differential share in the blade angle regulator can thereby be omitted, which would lead to a increase in unproductive blade angle adjustment activities.

The diagrams in FIG. 4, namely 4a, 4b and 4c, show the effect of the invention in the partial load area.

The first diagram FIG. 4a shows the measured wind speed 50 and the estimated wind speed 50'. The estimated wind speed 50' is calculated in the RPM tracker 25. The optimal rotational speed 27 or the third rotational speed target value 27 is calculated from the estimated wind speed 50', which can be dependent on the torque, the power coefficient CP and/or a mechanical loss. The optimal rotational speed 27 can be calculated for example with the tip speed ratio, being optimal for the wind speed.

FIG. 4b shows a diagram of the rotational speed in the generator over time. The second rotational speed target value 29 is represented with a solid line. A measured generator rotational speed 52 is also shown with a dashed line and the third rotational speed target value 27, which matches the optimal rotational speed target value. It can be seen that the measured generator rotational speed 52 tracks the optimal rotational speed target value 27. The second rotational speed target value 29 almost matches the measured generator rotational speed 52 and anticipates it a bit in this example. It is easy to see that the generator rotational speed follows the second rotational speed target value 29 very well. However, there is also a certain delay between the optimal rotational speed target value 27 and the second rotational speed target value 29.

In the diagram in FIG. 4c, the generator torque 51 is shown over time.

An important advantage of the new regulation method or regulation system is the better utilization of the available generator rotational speed range, whereby a higher aerodynamic efficiency is enabled with rotational speeds below the full load area.

As soon as the rotational speed increases, it is necessary to limit the torque in the generator and, thus, the electrical power. In this case, the generator torque is mainly held constant. The blade angle regulator not only works depending on the generator rotational speed but also depending on the generator torque. The effect of this torque-dependent blade angle regulation is that the blade angle regulator is active when the generator torque increases to full load mode. This is achieved through the formula specified above, in which the first rotational speed target value 28, which is supplied to the blade angle regulator 32, has a term, which depends on the torque. An important advantage of this blade angle regulator or this blade angle regulation is that it is inactive at low wind speeds, wherein the power of the wind turbine is not impacted, while it begins at high wind speeds so that a soft transition occurs from partial load mode to full load mode.

It is also advantageous that the blade angle regulator causes an immediate reaction when the generator torque does not match an internal torque target value. Provided that the generator torque (in particular the measured torque) is clearly smaller than the target value, the blade angle can be increased quickly, in order to avoid a rotor speed that is too high.

The effect of the torque-dependent blade angle regulation can be observed in the schematic diagrams in FIG. 5. It is assumed that the wind speed is close to the wind speed for full load mode. The first diagram according to FIG. 5*a* shows the wind speed over time. The second diagram according to FIG. 5*b* shows the diagram of the generator rotational speed over time. It is easy to see here that full load mode is partially present. This occurs when the wind speed lies above the nominal wind, i.e. at approx. 12 m/sec. In this case, the torque is moved to the nominal torque of 11 kNm set for the wind turbine.

The third diagram, FIG. 5*c*, shows the generator rotational speed over time, wherein three different functions are shown. For one, the rotational speed target value is shown, which lies at 1,800 revolutions per minute (rpm). The rotational speed measured in the generator is labeled with the number 52. The first rotational speed target value 28 is shown with a dashed line. In this case, the optimal power can be extracted from the wind turbine when the rotor is held at a speed of 1,800 revolutions per minute. For this reason, the (optimal) target value is held to this value. The first rotational speed target value 28 is dependent on the measured generator torque such that it lies somewhat above the third rotational speed target value 27, i.e. the optimal rotational speed target value, and namely as long as the torque itself lies below the maximum torque. The torque regulator 33 is thus then active when the measured torque is close to the torque target value.

In the fourth diagram (FIG. 5*d*), the blade angle is shown over time. The blade angle regulator is active for values greater than zero.

In accordance with the invention, the pitch regulation is thus dependent on the torque and the torque regulation is dependent on the pitch or blade angle. The optimal rotational speed target value 27 is, in particular in the partial load area, tracked and no fixed nominal rotational speed target value preferably exists explicitly for the blade angle regulator and also not for the torque regulator.

If in the partial load area the optimal rotational speed target value 27 lies particularly far above the actual value, it is preferably also possible to decrease the torque of the generator for a short period in order to accelerate the rotor more quickly to its target speed.

The 1st, 2nd and/or 3rd rotational speed target values can be the same in the nominal point, i.e. in the transition from partial load to full load. Thus, the 1st and 2nd rotational speed target values, the 1st and 3rd rotational speed target values and/or the 2nd and 3rd rotational speed target values can be the same there.

LIST OF REFERENCES

10 Wind turbine
11 Rotor
11' Shaft
12 Generator
13 Converter
14 Grid
15, 15' Rotorblade
16 Drive
17 Rotational movement
18, 18' Blade adjustment movement (pitching)
20 Measured torque
21 Torque target value
22 Blade angle deviation
24 Lower limit for blade angle target value (fine pitch)
25 RPM tracker
26 Calculation unit
27 Third rotational speed target value
28 First rotational speed target value
29 Second rotational speed target value
30 Torque difference
31 Blade angle difference
32 Blade angle regulator
33 Torque regulator
34 Blade angle target value
35 Torque set value
36 Blade angle adjustment device
37 Torque setting device
38 blade angle actual value
39 Difference device
40 k1
41 k2
42 Zero set element
50 Measured wind speed
50' Estimated wind speed
51 Generator torque
52 Measured generator rotational speed
54 Blade angle
60 Torque difference determination device
61 Torque determination device

What is claimed is:

1. Method for the regulation of the rotational speed (52) of a rotor (11, 11') of a wind turbine (10) with a generator (12) and at least one rotor blade (15, 15'), wherein a blade angle (54) (pitch) of the rotor blade (15, 15') is provided as a first set value and the torque (51) of the generator (12) is provided as a second set value, comprising the following steps:

Providing a first rotational speed target value (28) as the input value for a blade angle control or regulation device (32); and Calculating a second rotational speed target value (29), as the input value for a torque control or regulation device (33), wherein the first and the second rotational speed target value (28, 29) can be different from each other, wherein the first and the second rotational speed target value (28, 29) are different from each other in a transition area from partial load and full load of the wind turbine; and Regulating rotational speed of the rotor by changing blade angle using the blade angle control or regulation device Regulating rotational speed of the rotor of the generator by changing the torque using the torque control or regulation device and in full load of the wind turbine the rotational speed of the rotor is regulated by changing the blade angle using the blade angle control or regulation device and in partial load of the wind turbine the rotational speed of the rotor is regulated by changing the torque of the generator using the torque control or regulation device.

2. Method according to claim 1, wherein a third rotational speed target value (27) is provided, and wherein the first and the second rotational speed target value (28, 29) are determined from the third rotational speed target value (27).

3. Method according to claim 1, wherein the first rotational speed target value (28) is determined from a difference (30) between a torque target value (21) and a torque actual value (20) (torque difference (30)).

4. Method according to claim 3, wherein the torque difference (30) contributes to the determination of the first rotational speed target value (28) as a linear term.

5. Method according to claim 3, wherein the determination of the first rotational speed target value (28) comprises an addition of the third rotational speed target value (27) and the function k1×torque difference×θ (torque difference), wherein θ is the Heaviside function.

6. Method according to claim 3, wherein the determination of the second rotational speed target value (29) comprises a subtraction of the function k2×blade angle difference×θ (blade angle difference) from the third rotational speed target value (27), wherein θ is the Heaviside function.

7. Method according to claim 1, wherein the second rotational speed target value (29) is determined from a blade angle target value (34) and/or a difference (31) of a blade angle target value (34) and a blade angle actual value (38) (blade angle difference (31)).

8. Method according to claim 7, wherein the blade angle difference (31) contributes to the determination of the second rotational speed target value (29) as a linear term.

9. The method of claim 1, wherein the first and second rotation speed target values can be different from each other at the same instant in time.

10. Method for the regulation of the rotational speed (52) of a rotor (11, 11') of a wind turbine (10) with a generator (12) and at least one rotor blade (15, 15'), wherein a blade angle (54) (pitch) of the rotor blade (15, 15') is provided as a first set value and the torque (51) of the generator (12) is provided as a second set value, comprising the following steps:

Providing a first rotational speed target value (28) as the input value for a blade angle control or regulation device (32);

Providing a second rotational speed target value (29) as the input value for a torque control or regulation device (33), wherein the first and the second rotational speed target value (28, 29) can be different from each other;

wherein a third rotational speed target value (27) is provided, and wherein the first and the second rotational speed target value (28, 29) are determined from the third rotational speed target value (27); and wherein the third rotational speed target value (27) is determined from a torque actual value (20).

11. Method according to claim 10, wherein the third rotational speed target value (27), in particular with a, in particular specifiable, time delay, tracks the torque actual value (20).

12. Method for the regulation of the rotational speed (52) of a rotor (11, 11') of a wind turbine (10) with a generator (12) and at least one rotor blade (15, 15'), wherein a blade angle (54) (pitch) of the rotor blade (15, 15') is provided as a first set value and the torque (51) of the generator (12) is provided as a second set value, comprising the following steps:

Providing a first rotational speed target value (28) as the input value for a blade angle control or regulation device (32);

Providing a second rotational speed target value (29) as the input value for a torque control or regulation device (33), wherein the first and the second rotational speed target value (28, 29) can be different from each other;

wherein a third rotational speed target value (27) is provided, and wherein the first and the second rotational speed target value (28, 29) are determined from the third rotational speed target value (27); and wherein in the case of the exceeding of an, in particular specifiable, difference between a rotational speed actual value from the first, second and/or third rotational speed target value and/or in the case of the exceeding of an, in particular specifiable, value of the torque difference, the rotational speed of the rotor is quickly reduced.

* * * * *